United States Patent
Wolf et al.

[19]

[11] Patent Number: 5,915,674
[45] Date of Patent: Jun. 29, 1999

[54] ADJUSTABLE-LENGTH GAS SPRING

[75] Inventors: Herbert Wolf; Hans-Peter Bauer, both of Altdorf, Germany

[73] Assignee: Suspa Compart Aktiengesellschaft, Altdorf, Germany

[21] Appl. No.: 08/797,627

[22] Filed: Feb. 7, 1997

[30] Foreign Application Priority Data

Feb. 10, 1996 [DE] Germany .......................... 196 04 962

[51] Int. Cl.⁶ ...................................................... F16F 9/44
[52] U.S. Cl. ........................ 267/64.12; 188/300; 251/298; 267/117; 267/124; 267/131
[58] Field of Search ................... 267/64.12, 117, 267/131, 124, 120, 129, 64.11, 127, 64.28, 142; 188/300.67, 322.13, 299.1, 319.2, 282.1; 248/631, 188.2, 161, 404, 162.1; 16/66, 84; 297/344.19, DIG. 3, 303.2; 251/337, 354, 349, 227, 298, 251, 228

[56] References Cited

U.S. PATENT DOCUMENTS

| | | | |
|---|---|---|---|
| 3,711,054 | 1/1973 | Bauer | 248/161 |
| 3,988,001 | 10/1976 | Kankaras | 251/228 |
| 4,072,288 | 2/1978 | Wirges et al. | 188/300 |
| 4,096,785 | 6/1978 | Wirges . | |
| 4,124,202 | 11/1978 | Hatakeyama | 188/300 |
| 4,415,135 | 11/1983 | French | 248/162.1 |
| 4,632,228 | 12/1986 | Oster et al. | 188/300 |
| 4,793,450 | 12/1988 | Savenije . | |
| 5,090,770 | 2/1992 | Heinrichs et al. | 267/64.12 |
| 5,097,928 | 3/1992 | Enders et al. | 267/64.11 |
| 5,133,529 | 7/1992 | Kashima et al. | 248/631 |
| 5,141,210 | 8/1992 | Bauer et al. | 267/64.12 |
| 5,620,067 | 4/1997 | Bauer et al. | 248/631 |

FOREIGN PATENT DOCUMENTS

| | | |
|---|---|---|
| 0 564 776 | 10/1993 | European Pat. Off. . |
| 19 60 813 | 3/1966 | Germany . |
| 41 09 180 | 9/1991 | Germany . |
| 41 14 101 | 11/1992 | Germany . |
| 42 36 732 | 5/1994 | Germany . |
| 43 40 676 | 6/1995 | Germany . |
| 5106674 | 4/1993 | Japan ..................... 188/300 |

*Primary Examiner*—Douglas C. Butler
*Attorney, Agent, or Firm*—Browdy and Neimark

[57] ABSTRACT

An adjustable-length gas spring comprises a housing and a piston rod led out of the latter, on which a piston is disposed, dividing the housing into two partial housing chambers. Provision is made for a valve for the partial housing chambers to be connected with each other, the valve comprising a valve-operating lever, which is arranged pivotably at right angles to its longitudinal direction and a valve seat of which, when the lever is pivoted out of a position of rest into a position of opening of the valve, can be lifted off a seal, while forming a gap that connects the partial housing chambers with each other.

10 Claims, 5 Drawing Sheets

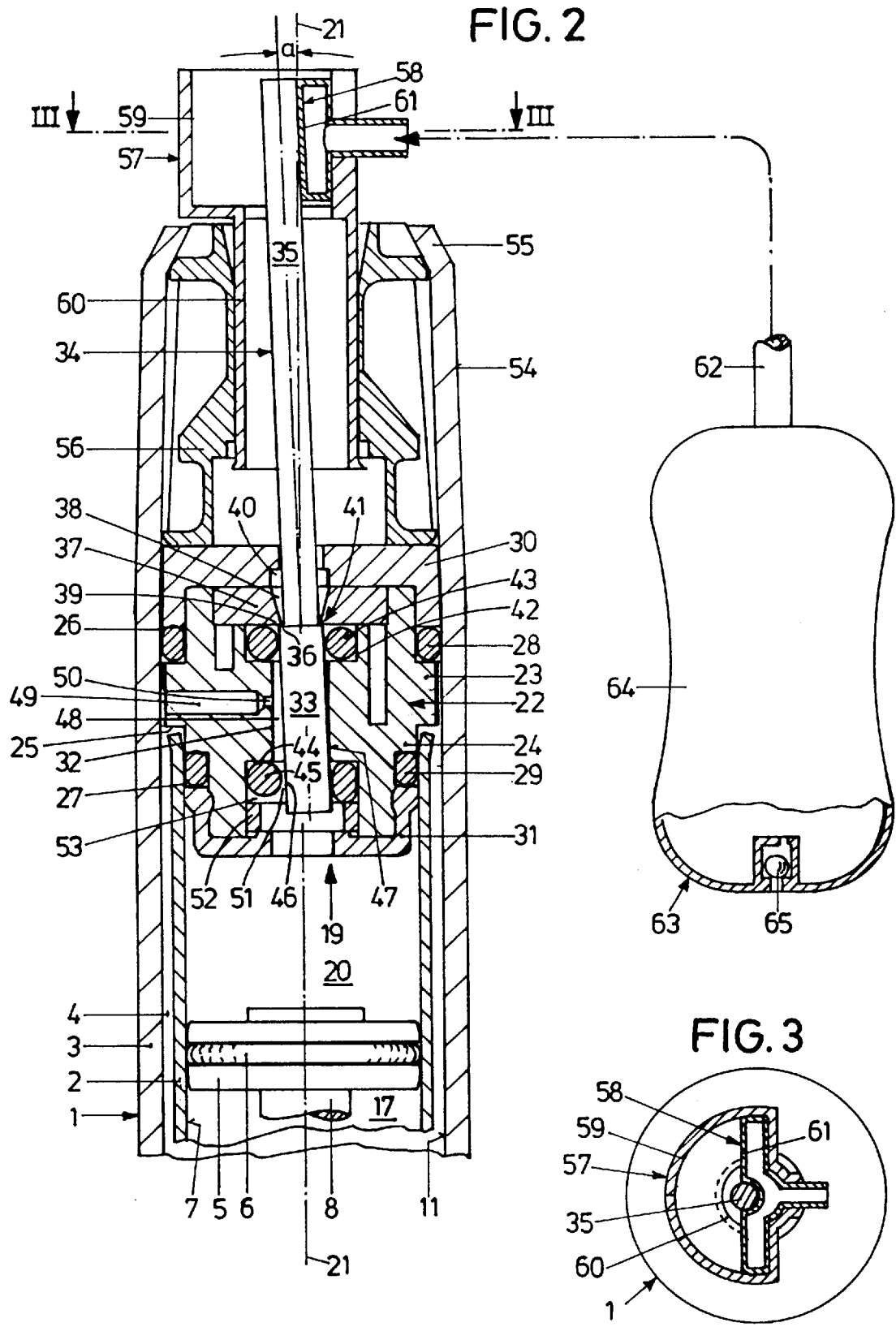

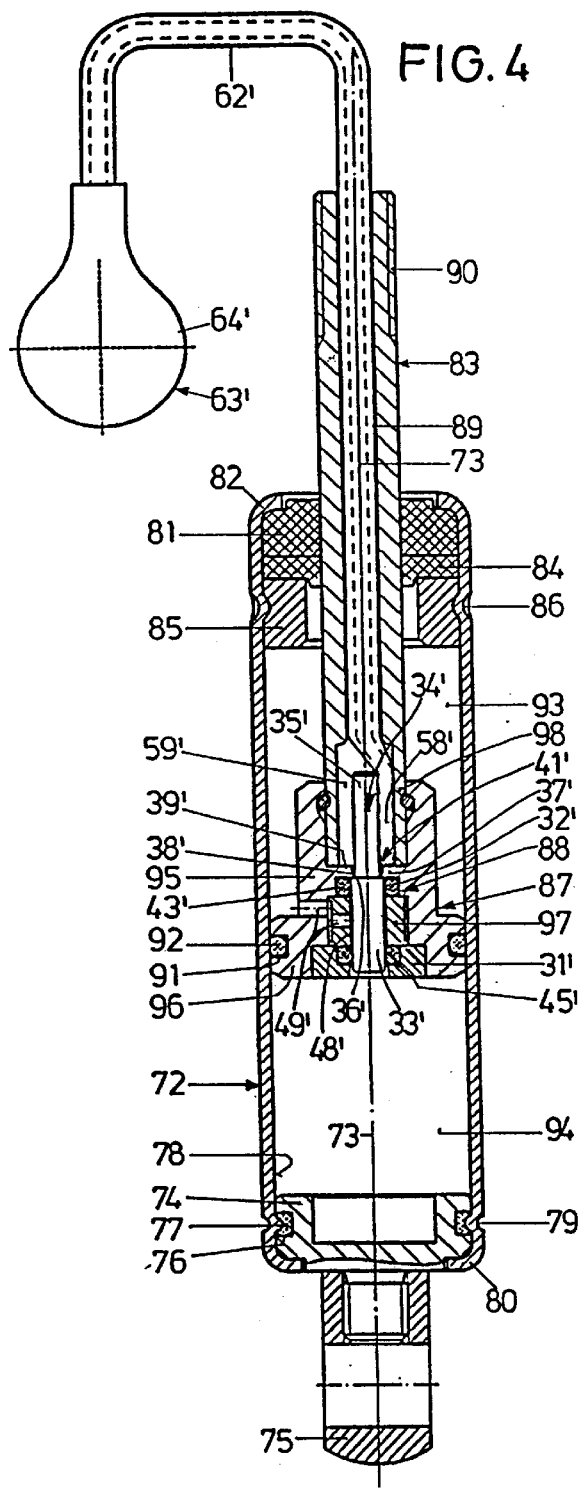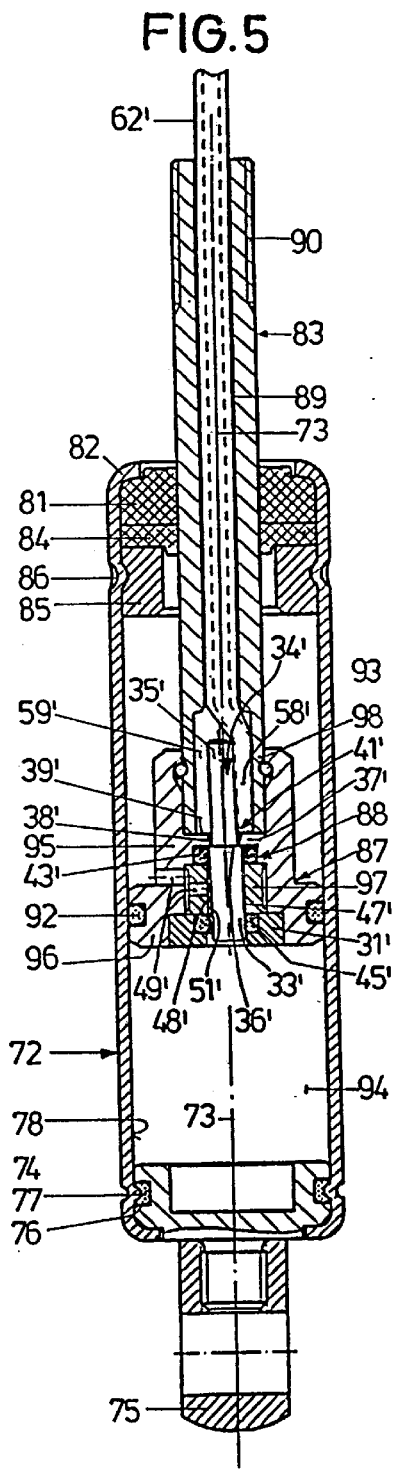

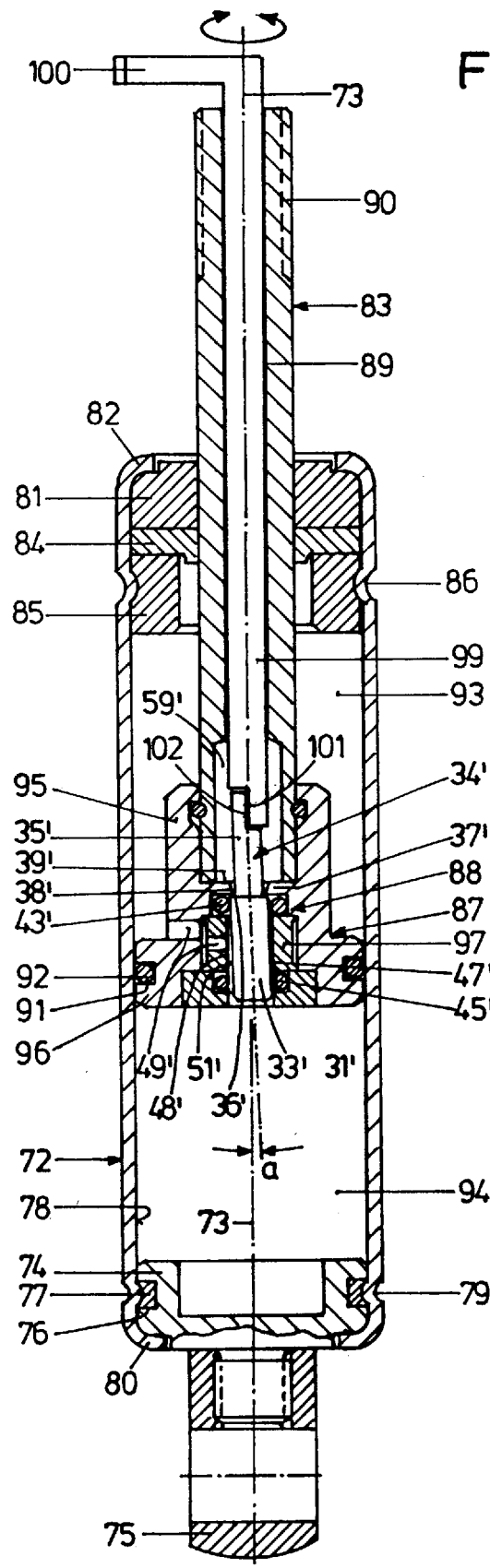

ADJUSTABLE-LENGTH GAS SPRING

BACKGROUND OF THE INVENTION

1. Field of the Invention

The invention relates to an adjustable-length gas spring comprising a housing having a central longitudinal axis, a piston rod led out of the housing concentrically of the central longitudinal axis, a piston arranged on the piston rod and displaceable in the housing and dividing the housing into two partial housing chambers, and a valve for the partial housing chambers to be connected with each other.

2. Background Art

In an adjustable-length gas spring of the generic type known from EP 0 564 776 A1, the adjusting arrangement is a hydraulic adjusting arrangement, the triggering device of which is provided with elastic locking tongues which are lockably engageable with the gas spring. Locking projections of the locking tongues engage with a rear recess allocated to the gas spring. This solution is satisfying as far as the locking engagement is concerned, but the manufacturing requirements are comparatively complicated. In addition, the hydaulic adjusting arrangement is hard to operate.

A gas spring with an adjusting arrangement is known from DE 42 36 732 A1, in which the cable of a Bowden cable is stationarily fixed to the gas spring and the hose surrounding the cable bears against an operating pin.

A gas spring with an adjusting arrangement comprising a Bowden wire is known from DE 41 14 101 A1. To this end, an operating lever is articulated to the end of the piston rod, actuating a valve pin that is disposed in the hollow piston rod.

An adjustable-length gas spring is known from U.S. Pat. No. 4,793,450, in which a valve between two partial housing chambers can be opened or closed by means of a fluidic triggering device to be actuated by an actuating bellows.

The drawback of all the known designs resides in that extraordinarily high operating forces are needed to open the valve.

SUMMARY OF THE INVENTION

It is the object of the invention to embody a gas spring of the generic type in such a way that the expenditure of force for it to be operated is especially low.

According to the invention, this object is attained by the valve having a valve-operating lever, which is arranged pivotably at right angles to its longitudinal direction, and a valve seat of which, when the lever is pivoted out of a position of rest into a position of opening of the valve, can be lifted off a seal, while forming a gap that connects the partial housing chambers with each other. The measures according to the invention help achieve that there is no longer any need for a valve pin to be pushed along the seals, overcoming high frictional forces—as with the known solutions—but that it is lifted off a seal. By reason of the high pressures of 100 bar and more that prevail in gas springs, sealing must take place at high sealing forces of the seals, which leads to correspondingly high operating forces in the known solutions. Due to the fact that in the design according to the invention, the valve-operating lever is pivoted, these high operating forces are not needed. Furthermore, the seals are no longer subject to wear.

The known and wide-spread adjustable-length gas springs that have a valve pin movable in the longitudinal direction of the housing only need comparatively little constructional modification in order to arrive at these surprising advantages. In particular, the measures according to the invention result in that operating the valve is possible at a low expenditure of forces by means of a pneumatically actuated triggering bellows or mechanically.

Further features, advantages and details of the invention will become apparent from the ensuing description of exemplary embodiments of the invention, taken in conjunction with the drawing:

BRIEF DESCRIPTION OF THE DRAWING

FIG. 2 is a partial longitudinal section, on an enlarged scale as compared with FIG. 1, through the gas spring according to FIG. 1 with the valve in a position when operated, FIG. 3 is a section, according to section line III—III in FIG. 2, through the triggering device of the gas spring, FIG. 4 is a longitudinal section of a second embodiment of an adjustable-length gas spring with the valve closed, FIG. 5 is a longitudinal section through the gas spring according to FIG. 4 with the valve opened, FIG. 6 is a longitudinal section of a gas spring slightly modified as opposed to FIGS. 4 and 5 with a purely mechanical triggering device for the valve.

DESCRIPTION OF THE PREFERRED EMBODIMENTS

Figure 1:
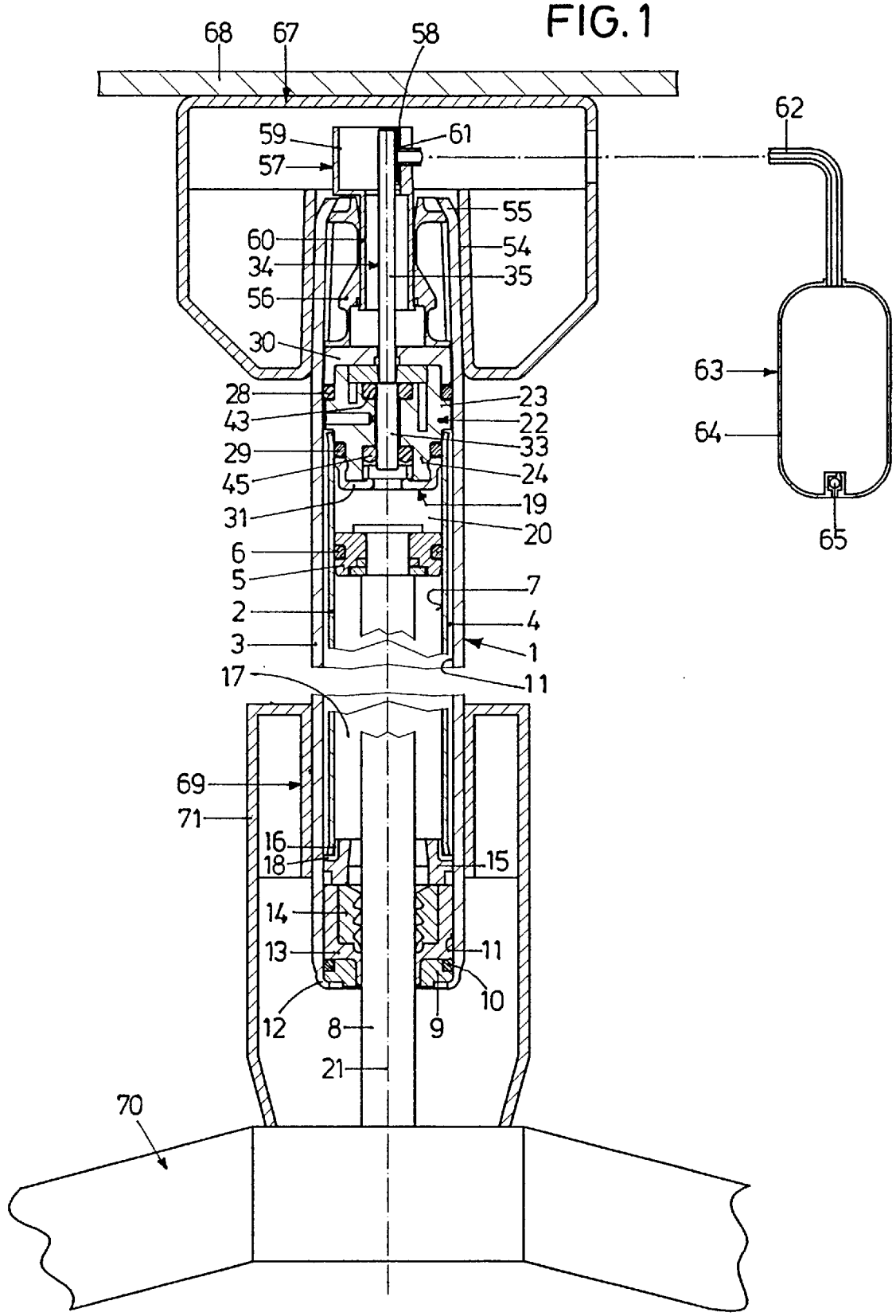
FIG. 1 is a longitudinal section of an adjustable-length gas spring.

The adjustable-length gas spring of FIGS. 1 and 2 has a housing 1 which substantially comprises two tubes of different diameters that are concentrically arranged one within the other, i.e. an interior cylinder 2 and an exterior cylinder 3. An annular chamber 4 forms between the exterior cylinder 3 and the interior cylinder 2 owing to the difference in diameter.

An approximately annular piston 5 is disposed for axial displacement in the interior cylinder 2; by means of a sealing ring 6, its circumference is made gastight toward the inside wall 7 of the interior cylinder 2. The piston 5 is fixed to one end of a piston rod 8 guided coaxially to the housing 1. This piston rod 8 is led out of one end of the housing 1. At this end, the housing 1 is closed by a closing ring 9, the circumference of which is made gastight towards the inside wall 11 of the exterior cylinder 3 by means of an annular seal 10. Axially to the outside, the closing ring 9 is retained by a bead 12 of the exterior cylinder 3. To the inside, a cup-shaped sleeve 13 bears against the closing ring 9, accommodating a multi-lip seal 14, the lips of which bear sealingly against the piston rod 8. In this way, any escape of gas along the surface of the piston rod 8 to the outside is precluded.

From the interior of the housing 1, a centering piece 15 that rests on the inside wall 11 of the exterior cylinder 3 supports itself on the sleeve 13; it is provided with ribs 16, on which the inside wall 7 of the interior cylinder 2 is supported radially, i.e. centered. The interior cylinder 2 is also axially firmly supported on these ribs 16, i.e. it is arrested axially unilaterally. Due to the fact that only ribs 16 are provided for the centering and axial support of the interior cylinder 2, the annular chamber 4, in this area, is connected with the partial housing chamber 17 in the interior cylinder 2, the partial housing chamber 17 being defined by the piston 5, the end on the piston exit side of the housing 1 and the inside wall 7 of the interior cylinder 2. Between the ribs 16, passageways 18 are formed between the partial housing chamber 17 and the annular chamber 4.

At the end of the housing 1 opposite to the piston rod exit, a valve 19 is disposed, by means of which the partial housing chamber 20 located in the interior cylinder 2 between the piston 5 and the valve 19 can be connected with, or separated from, the annular chamber 4 and, consequently, the other partial housing chamber 17.

The entire gas spring inclusive of the valve 19 is structured substantially symmetrical to the central longitudinal axis 21. The valve 19 has a valve body 22 formed by an outer section 23 and an inner section 24. The outer section 23 bears against the inside wall 11 of the exterior cylinder 3, the valve body 22 thereby being centered in relation to the exterior cylinder 3. The likewise cylindrical section 24 of a lower diameter bears against the inside wall 7 of the interior cylinder 2, centering being effected thereby between the valve body 22 and the interior cylinder 2 and, consequently, between the interior cylinder 2 and the exterior cylinder 3. Where the section 23 passes into the section 24, a stop collar 25 is formed, by means of which the valve body 22 bears against the interior cylinder 2 in the axial direction. In the vicinity of the section 23 on the one hand and the section 24 on the other, annular seals 28, 29 are disposed in corresponding annular grooves 26, 27, by means of which gastight connection is produced between the section 23 and the inside wall 11 of the exterior cylinder 3 on the one hand and between the inner section 24 and the inside wall 7 of the interior cylinder 2 on the other hand. The annular groove 26 allocated to the outer section 23 is defined by a cup-shaped outer cover 30 of the valve body 22 placed on the outer section 23. The annular groove 27 allocated to the inner section 24 is defined by an inner cover 31 of the valve body 22 that is mounted on the inner section 24 and turned towards the partial housing chamber 20. As a rule, the valve body 22 and the covers 30, 31 consist of a suitable plastic material and are joined to each other by adhesion or ultrasonic welding.

Concentrically of the axis 21, the valve body 22 is provided with a cylindrical recess 32, in which is disposed a likewise cylindrical inner arm 33 of a double-armed valve-operating lever 34, the other, outer arm 35 of which is disposed substantially outside the valve body 22. By means of an annular collar 36 formed between the inner arm 33 of greater diameter and the outer arm 35 of smaller diameter, the operating lever 34 bears against an abutment 37, which is formed by a ring wheel, which suitably consists of metal and is inserted in the valve body 22 and held by the outer cover 30. It has an opening 38, which is concentrical of the axis 21 and enlarges outwardly, i.e. toward the outer arm 35. On its side turned towards the inner arm 33 of the operating lever 34, it has a bearing collar 39, against which supports itself the annular collar 36 of the operating lever 34. Likewise concentrically of the axis 21, the outer cover 30 has a through hole 40 for the outer arm 35, which has a diameter exceeding that of the outer arm 35 so that the operating lever 34, which in its position of rest runs concentrically of the axis 21, can be pivoted relative to the axis 21 about the pivot bearing 31 formed by the bearing collar 39 and the annular collar 36, as roughly outlined in FIG. 2.

In the outer section 23 of the valve body 22, an annular groove 42 is formed, which is defined by the abutment 37 and in which is disposed an annular seal 43 that bears sealingly against the inner arm 33. This annular seal 43 is disposed in direct vicinity to the pivot bearing 41. Even in case the operating lever 34 is pivoted, it will always seal the cylindrical recess 32 to the outside, i.e. it prevents any escape of compressed gas out of the housing 1 to the outside. In the portion, turned towards the partial housing chamber 20, of the inner section 24 of the valve body 22, an annular seal 45 is disposed in an expansion 44 of the cylindrical recess 32, this annular seal 45 resting sealingly against the inner arm 33 of the operating lever 34 in the position of rest of the operating lever 43, which is seen in FIG. 1 and in which the latter is disposed concentrically of the axis 21, the surface by which the inner arm 33 bears against this annular seal 45 forming a valve seat 46.

In the case of maximum pivoting of the operating lever 34 about the pivot bearing 41 as seen in FIG. 2, the inner arm 33 comes to bear against the wall of the cylindrical recess 32 in direct vicinity to the annular seal 45, there forming a stop 47. As seen in particular in FIG. 2, the cylindrical recess 32 is wider than the inner arm 33 of the operating lever 34, whereby the pivotability specified is rendered possible and whereby a channel 48 is formed between the wall of this cylindrical recess 32 and the inner arm 33 of the operating lever 34, into which opens a passageway 49 of approximately radial extension which is formed in the outer section 23 and which connects the annular chamber 4 with the channel 48 and which is provided with a throttling spot 50.

The annular seal 45 is dimensioned such that when the operating lever 34 is pivoted as far as against the stop 47, the valve seat 46 of the inner arn 33 is lifted off the annular seal 45 on the side diametrically opposite to the stop 47 to such an extent that a very small gap 51 forms there, through which compressed gas can flow out of the partial housing chamber 20, through the expansion 44, the gap 51, the channel 48, the passageway 49, the annular chamber 4 and the passageways 18 into the partial housing chamber 17 and vice versa. If, however, the operating lever 34 is in its position of rest, then the annular seal 45 bears against the valve seat 46, sealing all around so that there is no gap 51. When the valve 19 is opened in the way specified, the annular seal 45 is strongly compressed radially to the axis 21 on the side adjacent to the stop 47; for this radial compression to be compensated by corresponding expansion parallel to the axis 21, an annular web 52 is provided, which is tightly connected with the inner cover 31, and which retains the annular seal 45 in the expansion 44, and which in the position of rest of the operating lever 34—as seen on the left of FIG. 2—has some play 53 in the direction of the axis 21 towards the annular seal 45. In the range of this play 53, the annular seal 45 may deform parallel to the axis 21 when the valve 19 opens—as seen on the right of FIG. 2.

The pivoting motion of the operating lever 34 about the pivot bearing 41 is in the range of a pivoted angle a of 2 to 3°.

The portion of the housing 1 that is opposite to the piston rod 8 exit—the upper portion in the drawing—exhibits a conically tapered fastening section 54, the edge 55 of which is necked inwardly toward the axis 21. This edge 55 forms a stop for a spacing sleeve 56, on which the valve body 22 supports itself in the direction of the axis 21. A triggering device 57 for the valve-operating lever 34 is disposed in the spacing sleeve 56. It comprises a fluidically, in particular pneumatically, actuated triggering bellows 58 formed in a chamber 59 which is retained in the spacing sleeve 56 by means of a connection piece 60. As seen in particular in FIG. 3, the triggering bellows 58 has a membrane 61 which bears against the outer arm 35 of the operating lever 34 led upwards out of the housing 1. By way of a hose 62, the chamber 59 defined by the membrane 61 is connected to an actuating device 63, which is formed by an actuating bellows 64. The latter comprises a filling valve 65 in the form of a check valve which, in the case of partial vacuum in the actuating bellows 64, the hose 62 and the triggering bellows 58, opens towards atmospheric pressure, allowing air to enter. The filling valve 65 closes in the case of compression of the actuating bellows 64 and the overpressure thus produced in the actuating bellows 64, hose 62 and triggering bellows 58. The actuating bellows consists of elastic material such as rubber, taking a for instance substantially cylindrical shape in its position of rest seen in FIG. 1. When the actuating bellows 64 is compressed as illustrated in FIG. 2, air is forced through thge hose 62 into the chamber 59, whereby the membrane 61 is deformed and pivots the operating lever 34 in the manner described. The chamber 59 is defined by the membrane 61 and a stationary wall 66 of the triggering device 57. The triggering device 57 can be inserted as a plug-in element from above into the spacing sleeve 56. The triggering bellows 58 can also be disposed directly in the fastening section 54, supporting itself directly or indirectly on the latter's inside wall.

In conventional manner, the adjustable-length gas spring filled at least partially with compressed gas is used in such a way that the conically tapered fastening section 54 is fixed by cone clamping in a corresponding holding device 67 on the lower side of the seat 68 of a chair, the housing 1 of the gas spring being disposed displaceably in the direction of the axis 21, however guided at right angles thereto, in a guide bush 69 of an upright tube 71 joined to a pedestal 70 of a chair. The piston rod 8 is mounted rotatably on the bottom of such an upright tube 71. This configuration is general practice.

FIGS. 4 and 5 illustrate another embodiment of an adjustable-length gas spring. It comprises a cylindrical housing 72 formed for instance by a steel pipe and having a central longitudinal axis 73. At one end, the housing 72 is closed by means of a closing plug 74, on which a so-called eye is disposed as a fastening means 75. On its circumference, the closing plug 74 has a groove 76 in which an annular seal 77 is disposed, bearing sealingly against the inside wall 78 of the housing 72. The closing plug 74 is arrested relative to the housing 72 in the direction of the axis 73 in that the housing 72 has a crimp 79 forced against the seal 77 and into the groove 76. Moreover, the associated end of the housing 72 is provided with a bead 80 encircling the closing plug 74 externally.

At the other end, the housing 72 is provided with a guide bush 81 which is disposed concentrically of the axis 73 and over the outside of which also grips a bead 82 of the housing 72. In the guide bush 81, a piston rod 83 disposed concentrically of the axis 73 and led out of the housing 72 is guided displaceably in its longitudinal direction. A ring-wheel-type seal 84 supports itself on the guide bush 81, on the one hand bearing sealingly against the inside wall 78 of the housing 72 and on the other hand against the piston rod 83. The seal 84 is held axially towards the interior of the housing 72 by a holding ring 85 which arrested axially by means of a crimp 86 forced into the housing 72 or by means of knob-type impressions distributed over the circumference. Owing to the measures specified, the housing 72 is closed gas- and fluid-tight at both ends.

A piston 87 with an integrated valve 88 is mounted on the end of the piston rod 83 that is located in the housing 72. Actuation of the valve 88 from outside takes place through a drilled hole 89 provided in the piston rod 83 and running concentrically of the axis 73. The outer end of the piston rod is provided with an external thread 90 on which to mount a fastening device (not shown).

On its outside, the piston 87 is provided with a groove 91, in which an annular seal 92 is disposed, beating sealingly against the inside wall 78 of the housing 72. It divides the interior chamber of the housing 72 into two partial housing chamber 93 and 94. It comprises a substantially cylindrical valve body 95, to which the piston rod 83 is joined. The valve body 95 has an annular collar 96 serving for guidance on the inside wall 78 of the housing 72 and as an accommodation for the annular seal 92.

The valve 88 has a structure similar to, and functions identical with, the valve 19 of the exemplary embodiment according to FIGS. 1 and 2. In the following, constructionally different, but functionally equivalent pieces have the same reference numerals as in the exemplary embodiment according to FIGS. 1 and 2, however provided with a prime. Concentrically of the central longitudinal axis 73, a substantially cylindrical recess 32' is provided in the valve body 95, which is defined in the direction towards the piston rod 83 by a ring-wheel-type abutment 37' formed in one piece with the valve body 95 and having an opening 38' that enlarges towards the piston rod, thereby forming a bearing collar 39'. In the vicinity of this abutment 37', the piston rod exhibits an expansion of the drilled hole 89 that serves as as chamber still to be specified. The inner arm 33' and the outer arm 35' of a valve-operating lever 34' are disposed in the recess 32' and the chamber 59', respectively, an annular collar 36' cooperating with the bearing collar 39' to form a pivot bearing 41' between the inner arm 33' of greater diameter and the outer arm 35' of smaller diameter. An annular seal 43' is disposed in the recess 32' in direct vicinity to the abutment 37'. Another annular seal 45' is provided, neighboring the partial housing chamber 94, i.e. neighboring the end of the inner arm 33' of the operating lever 34' that is remote from the pivot bearing 41'. For reasons of mounting, a spacing sleeve 97 is provided between the two annular seals 43' and 45' for the annular seals 43' and 45' to be fixed unilaterally. In the valve body 95, provision is made for a passageway 49' which connects the partial housing chamber 93 with a channel 48' that encircles the inner arm 33' and which may also have a throttling spot. The annular seal 45' is retained by an inner ring-wheel-type cover 31' fixed to the valve body 95. When the operating lever 34' is pivoted out of the position of rest, in which it is in alignment with the axis 73, into the pivoted position shown in FIG. 5, the inner arm 33' comes to bear against a stop 47' formed on the cover 31' or the spacing sleeve 97, the opposite valve seat 46' is lifted off the annular seal 45', forming a gap 51', whereby the partial housing chambers 93 and 94 are connected with each other.

In the chamber 59', which is formed in the portion of the valve body 95 that accommodates the piston rod 83, a triggering bellows 58' is disposed as a triggering device 57', supporting itself on the wall 98, formed in the piston rod 83, of the chamber 59' and on the other hand bearing against the outer arm 35' of the operating lever 34. By way of a hose 62', which is substantially inelastic but pliable in the same way as in the embodiment according to FIGS. 1 and 2, the triggering bellows 58' is connected with an actuating device 63' formed by an actuating bellows 64'. Upon compression of the actuating bellows 64', fluid is pressed into the triggering bellows 58', expanding the latter so that it pivots the operating lever 34' from the position of rest shown in FIG.

4 into the position shown in FIG. 5, in which the valve 88 is open for fluid, i.e. compressed gas or liquid, to flow from one of the partial housing chambers 93 or 94 into the other partial housing chamber 94 or 93.

As can be seen from the exemplary embodiment according to FIG. 6, which is largely identical with the embodiment according to FIGS. 4 and 5, operating the valve 88 can also be purely mechanical. To this end, an actuating rod 99 pivotable about the axis 73 is disposed in the drilled hole 89 of the piston rod 83, the end of the actuating rod 99 that projects over the piston rod 83 having a pivotal actuating handle 100.

At their ends located in the chamber 59', the actuating rod 99 and the outer arm 35' engage with each other by two actuating faces 101 and 102 that work like an eccentric so that when the actuating rod 99 is pivoted by means of the actuating handle 100 about the axis 73, the actuating face 101 of the actuating rod 99 displaces the actuating face 102 of the outer arm 35' at right angles to the axis 73, which causes the described pivotal motion of the operating lever 34'.

The actuating faces between the actuating rod and the outer arm of the operating lever can also be configured in such a way—for instance as slopes that the pivotal motion of the operating lever is effected upon displacement of the operating rod in the direction of the axis.

Figure 7:
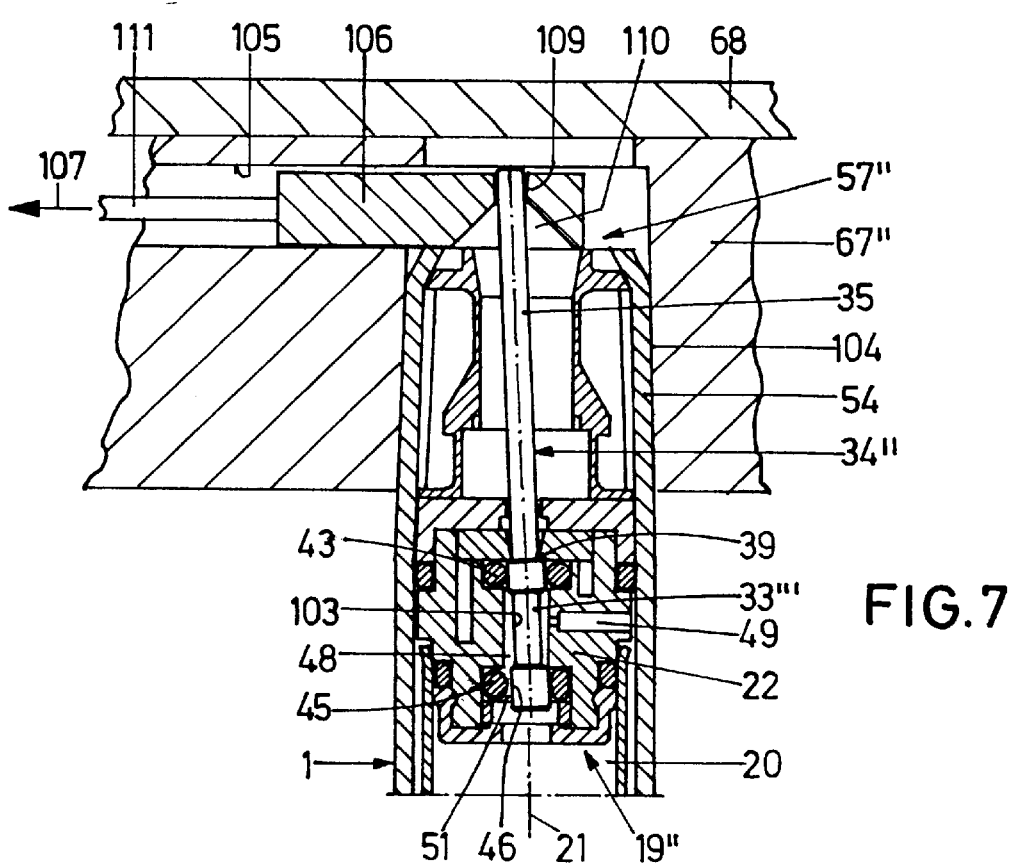
FIG. 7 is a partial longitudinal section through a modified embodiment of a gas spring with the valve in a position operated by traction.
Figure 8:
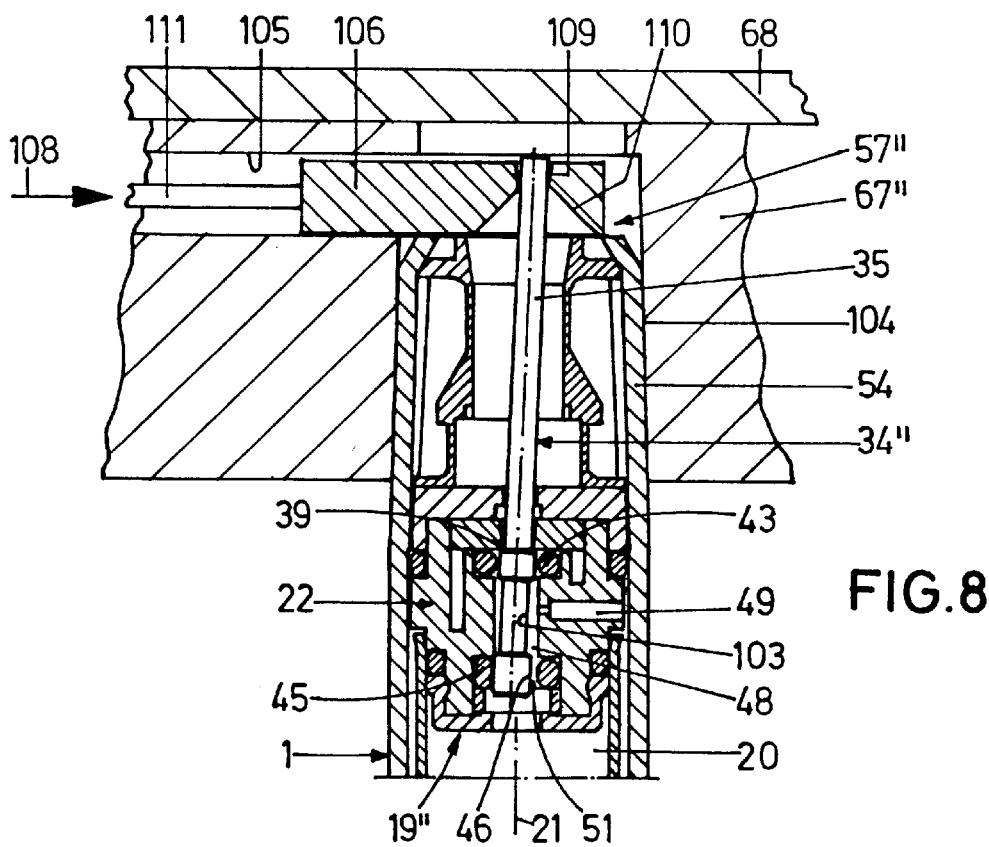
FIG. 8 is a partial longitudinal section throughthe gas spring according to FIG. 7 with the valve in a position operated by pressure.

In as much as components are provided in the embodiment according to FIGS. 7 and 8 that are identical with the embodiment according to FIGS. 1 and 2, the same reference numerals are used, there being no need of renewed description. If components differ in construction but are identical in function, the same reference numerals are used as in FIGS. 1 and 2, however provided with a double prime.

In the embodiment according to FIGS. 7 and 8, the valve operating lever 34" of the valve 19" comprises an inner arm 33", the portion of which located between the annular seals 43 and 45 having a necking 103 so that upon pivoting of the valve-operating lever 34", the channel 48 always exhibits a sufficiently dimensioned free cross-section.

An accommodation 105, which extends at right angles to the axis 21 and in which a slide 106 is disposed for displacement in the direction of the arrows 107 and 108, is formed in the holding device 67" above a recess 104 that houses the fastening section 54 of the housing 1. The slide 106 has a drilled hole 109 receiving the associated end of the valve-operating lever 34", the drilled hole 109 being again provided with a lead-in 110 enlarging towards the recess 104 in the way of a hopper. An actuating element 111 is arranged on the slide 106, by means of which the slide 106 can be displaced in the accommodation 105 at right angles to the axis 21. The pivoting, specified above in connection with FIGS. 1 and 2, of the valve operating lever 34" can be effected by traction corresponding to the arrow 107 in accordance with the illustration of FIG. 7 or by pressure corresponding to the arrow 108 of FIG. 8. The actuating element 111 may for instance be a Bowden cable or a rod. Together with the actuating element 8, the slide 106 guided in the accommodation 105 forms a triggering device 57".

What is claimed is:

1. An adjustable-length gas spring comprising
   a housing (1, 72) having a central longitudinal axis (21, 73),
   a piston rod (8, 83) led out of the housing (1, 72) at an exit concentrically of the central longitudinal axis (21, 73),
   a piston (5, 87) arranged on the piston rod (8, 83) and displaceable in the housing (1, 72) and dividing the housing (1, 72) into a first partial housing chamber (17, 93) and a second partial housing chamber (20, 94),
   a valve (19, 88, 19") for connecting said first partial housing chamber (17, 93) and said second partial housing chamber (20, 94),
   a passageway (49, 49') connecting said first partial housing chamber (17, 93) with said valve (19, 88, 19"),
   said valve (19, 88, 19") comprising a seal (45; 45') and a valve-operating lever (34, 34', 34") having a longitudinal direction with a valve seat (46, 46'),
   said valve-operating lever (34, 34', 34") being arranged pivotably at right angles to said longitudinal direction out of a rest position into an opening position,
   wherein in said rest position said valve seat (46, 46') rests on said seal (45, 45'), separating said passageway (49, 49') from said second partial housing chamber (20, 94) and wherein in said opening position a gap (51, 51') is formed between said valve seat (46, 46') and said seal (45, 45'), connecting said passageway (49, 49') with said second partial housing chamber (20, 94).

2. A gas spring according to claim 1, wherein the valve-operating lever (34, 34', 34") extends in the direction of the central longitudinal axis (21, 73).

3. A gas spring according to claim 1, wherein the valve-operating lever (34, 34', 34") is a two-armed lever having a first arm (33, 33', 33") which comprises the valve seat (46, 46') and a second arm (35, 35') which is in operating engagement with a triggering device (57, 57', 57").

4. A gas spring according to claim 3, wherein the triggering device (57, 57') comprises a fluidically expansible triggering bellows (58, 58'), which is connected with an actuating device (63, 63') by way of a hose (62, 62').

5. A gas spring according to claim 3, wherein the triggering device includes an actuating rod (99), which is coupled with the valve-operating lever (34') by way of actuating faces (101, 102).

6. A gas spring according to claim 3, wherein the triggering device (57") is formed by a mechanical actuating member which is in operating engagement with the valve-operating lever (34") by one of traction or pressure.

7. A gas spring according to claim 1, wherein the valve-operating lever (34, 34', 34") is lodged in a pivot bearing (41, 41').

8. A gas spring according to claim 7 wherein a seal (43, 43') is provided on the valve-operating lever (34, 34') in direct vicinity to the pivot bearing (41, 41').

9. A gas spring according to claim 1, wherein the valve (19, 19") is disposed at an end of the housing (1) that is opposite to said exit of the piston rod (8).

10. A gas spring according to claim 1, wherein the valve (88) is provided in the piston (87).

* * * * *